United States Patent
Sinur et al.

(10) Patent No.: US 12,241,634 B2
(45) Date of Patent: Mar. 4, 2025

(54) RANGE HOOD VENTILATION SYSTEM AND CONTROL THEREFOR

(71) Applicant: Broan-NuTone LLC, Hartford, WI (US)

(72) Inventors: Richard R. Sinur, Hartford, WI (US); Jason Asmus, Hartford, WI (US); Elizabeth Egbers, Hartford, WI (US)

(73) Assignee: Broan-NuTone LLC, Hartford, WI (US)

( * ) Notice: Subject to any disclaimer, the term of this patent is extended or adjusted under 35 U.S.C. 154(b) by 434 days.

(21) Appl. No.: 17/749,246

(22) Filed: May 20, 2022

(65) Prior Publication Data

US 2023/0031687 A1 Feb. 2, 2023

Related U.S. Application Data

(60) Provisional application No. 63/227,612, filed on Jul. 30, 2021.

(51) Int. Cl.
*F24C 15/20* (2006.01)
*G06F 3/01* (2006.01)

(52) U.S. Cl.
CPC ...... *F24C 15/2021* (2013.01); *F24C 15/2064* (2013.01); *G06F 3/017* (2013.01)

(58) Field of Classification Search
CPC .............. F24C 15/2021; F24C 15/2042; F24C 15/2064; G06F 3/017
USPC ....................................................... 126/299 R
See application file for complete search history.

(56) References Cited

U.S. PATENT DOCUMENTS

| | | | | |
|---|---|---|---|---|
| 2012/0062456 A1* | 3/2012 | Munekata | ............. | G06F 3/0304 345/157 |
| 2018/0372332 A1* | 12/2018 | Cha | .......................... | G06F 3/147 |

* cited by examiner

*Primary Examiner* — Vivek K Shirsat
(74) *Attorney, Agent, or Firm* — Barnes & Thornburg LLP

(57) ABSTRACT

According to an aspect of the present disclosure, a ventilation system includes at least one user directed component and a plurality of sensors configured to detect a plurality of control gestures within a gesture field designated for presentation of control gestures by a user. The ventilation system may further be configured such that a control gesture of the plurality of control gestures is presented within the gesture field for detection of said control gesture by the plurality of sensors, and the plurality of sensors recognizes the control gesture as corresponding to an operation of the at least one user directed component. The ventilation system may still further include a controller for polling the plurality of sensors and converting a recognized control gesture to a command signal for operating the at least one user directed component.

19 Claims, 17 Drawing Sheets

| HAND POSITION | d1 | d2 | d3 | t1 | t2 | t3 | DESCRIPTION | ACTION |
|---|---|---|---|---|---|---|---|---|
| — | d2 +/-1" | 0-6" | d2 +/-1" | 3s | 3s | 3s | HOLD HAND UNDER SENSOR ARRAY WITHIN 6" FROM BOTTOM OF THE HOOD FOR 3s. HAND NEEDS TO BE PARALLEL TO HOOD WITHIN 2" TOTAL. | TURNS ON HOOD TO LAST SPEED SETTING |
| ↺ | d2>+2" | 0-6" | d2>-2" | 1s | 1s | 1s | ROTATE HAND COUNTERCLOCKWISE WHEN FAN IS ON | INDEXES SPEED DOWN |
| ↻ | d2>-2" | 0-6" | d2>+2" | 1s | 1s | 1s | ROTATE HAND CLOCKWISE WHEN FAN IS ON | INDEXES SPEED UP |
| ⇄ | d2 +/-1" | 0-6" | d2 +/-1" | <0.5s | <0.5s | <0.5s | SWIPE HAND LEFT OR RIGHT WITHIN 6" FROM BOTTOM OF THE HOOD | TURNS FAN OFF |
| — | d2 +/-1" | 7-13" | d2 +/-1" | 3s | 3s | 3s | HOLD HAND UNDER SENSOR ARRAY BETWEEN 7"-13" FROM BOTTOM OF THE HOOD FOR 3s. HAND NEEDS TO BE PARALLEL TO HOOD WITHIN 2" TOTAL. | TURNS ON LIGHT TO LAST SETTING |
| ⇑ | d2<-2" | 7-13" | d2<-2" | 1s | 1s | 1s | MOVE HAND UPWARD >2" WHEN LIGHT IS ON | INDEXES LIGHT SETTING UP |
| ⇑ | d2>+2" | 7-13" | d2>+2" | 1s | 1s | 1s | MOVE HAND UPWARD >2" WHEN LIGHT IS ON | INDEXES LIGHT SETTING DOWN |
| ⇄ | d2 +/-1" | 7-13" | d2 +/-1" | <0.5s | <0.5s | <0.5s | SWIPE HAND LEFT OR RIGHT WITHIN 7-13" FROM BOTTOM OF THE HOOD | TURNS OFF LIGHT |

FIG. 3

RANGE HOOD VENTILATION SYSTEM AND CONTROL THEREFOR

CROSS-REFERENCE TO RELATED APPLICATIONS

This application claims the benefit of U.S. Provisional Application No. 63/227,612, filed on Jul. 30, 2021, which is incorporated in its entirety herein by reference and made a part hereof.

TECHNICAL FIELD

The present subject matter relates to control systems for air quality management, and more particularly, to control of range hood ventilation via gesture sensor(s).

BACKGROUND

Often times, controls for range hood ventilation systems comprise conventional, physical switches, e.g., for switching a fan on and off, for switching a light on and off, and/or for switching between fan speeds or light brightness levels. Conventional range hood ventilation systems typically have only a limited number of settings and functions. Further, operation of such range hood ventilation systems requires physical contact with the one or more physical switches that operate to toggle the above-noted functions between on and off in varying combinations. Range hood ventilation systems are typically installed above cooking surfaces to remove pollution entering indoor air via the act of cooking and/or meal preparation. Of course, cooking often involves the handling of ingredients. Home cooks and professional chefs alike may desire to avoid touching physical elements of their surroundings during meal preparation. In view of this need, a control system for operating range hood ventilation systems without touching physical components represents an improvement over conventional hood fan systems and control systems.

The description provided in the background section should not be assumed to be prior art merely because it is mentioned in or associated with the background section. The background section may include information that describes one or more aspects of the subject technology.

SUMMARY

According to an aspect of the present disclosure, a ventilation system includes at least one user directed component and a plurality of sensors configured to detect a plurality of control gestures within a gesture field designated for presentation of control gestures by a user. The ventilation system may further be configured such that a control gesture of the plurality of control gestures is presented within the gesture field for detection of said control gesture by the plurality of sensors, and the plurality of sensors recognizes the control gesture as corresponding to an operation of the at least one user directed component. The ventilation system may still further include a controller for polling the plurality of sensors and converting a recognized control gesture to a command signal for operating the at least one user directed component.

The ventilation system according to this aspect may further be configured such that the plurality of sensors comprises a number of time-of-flight sensors.

The ventilation system according to this aspect may further be configured such that the plurality of sensors is configured in an array and directed at the gesture field.

The ventilation system according to this aspect may further be configured such that data from the plurality of sensors in the array is compared to recognize hand motions corresponding to a particular control gesture of the plurality of control gestures.

The ventilation system according to this aspect may further be configured such that the ventilation system is a range hood mounted above a cooking surface and including at least a fan and a light source.

The ventilation system according to this aspect may further be configured such that the plurality of sensors is disposed on the range hood facing toward the cooking surface thereby configuring the gesture field between the range hood and the cooking surface.

The ventilation system according to this aspect may further be configured such that the plurality of sensors determines a distance and a time-at-distance for subjects that enter the gesture field.

The ventilation system according to this aspect may further be configured such that the distance and the time-at-distance detected by each of the number of time-of-flight sensors are compared to recognize a particular control gesture of the plurality of control gestures.

The ventilation system according to this aspect may further be configured such that the control gestures adjust an operational state of at least one of the fan and the light source of the range hood.

According to yet another aspect of the present disclosure, a method of operating a range hood ventilation system may include steps for configuring a plurality of sensors to detect movement proximal the range hood ventilation system, comparing the movement detected by each of the sensors to determine relative location information about the movement, determining whether the movement is intended as one of a plurality of control gestures, and operating the range hood ventilation system in response to a determination that the movement is a particular one of the plurality of control gestures.

The method of operating the range hood ventilation system according to this aspect may further be performed such that the plurality of sensors is arranged in one or more arrays along one or more surfaces of the range hood.

The method of operating the range hood ventilation system according to this aspect may further include storing in memory a plurality of control processes that correspond to the plurality of control gestures.

The method of operating the range hood ventilation system according to this aspect may further be performed such that the control processes are invoked by detection of one or more of the plurality of control gestures.

The method of operating the range hood ventilation system according to this aspect may further include executing at least one control process invoked by detection of the one or more control gestures to alter an operational state of at least one of a fan and a light source.

The method of operating the range hood ventilation system according to this aspect may further be performed such that directional movements in the one or more control gestures indicate a relative change in operational state of the at least one of the fan and the light source.

The method of operating the range hood ventilation system according to this aspect may further be performed such that the directional movements in the one or more control gestures indicate an increase or a decrease in fan speed, dependent on the direction.

The method of operating the range hood ventilation system according to this aspect may further be performed such that the directional movements in the one or more control gestures indicate an increase or a decrease in light intensity of the light source, dependent on the direction.

According to yet another aspect of the present disclosure, a control system may include a range hood ventilation system, and that range hood ventilation system may further include a plurality of sensors, a memory, a processor, a plurality of operational states, and a plurality of control gestures. Also, in accordance with this aspect, the control system may further be configured such that the at least one of the plurality of control gestures is detected by the plurality of sensors. Further still, the control system may include a control command determined by the processor in response to analyzing data from the plurality of sensors when the at least one of the plurality of control gestures is detected, and the control system may be configured such that the control command changes an operational state of the range hood ventilation system from a current operational state to another operational state of the plurality of operational states.

The control system according to this aspect may further be configured such that the plurality of sensors includes at least one of time-of-flight sensors, infrared sensors, optical sensors, and ultrasonic sensors.

The control system according to this aspect may further be configured such that each of the plurality of control gestures are defined by a movement sequence of the hand of a user as detected by more than one of the plurality of sensors over a period of time.

Other aspects and advantages of the present invention will become apparent upon consideration of the following detailed description and the attached drawings wherein like numerals designate like structures throughout the specification.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 3 is a table including illustrations of gestures for use in the control method of FIGS. 1 and 2;

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Figure 1:
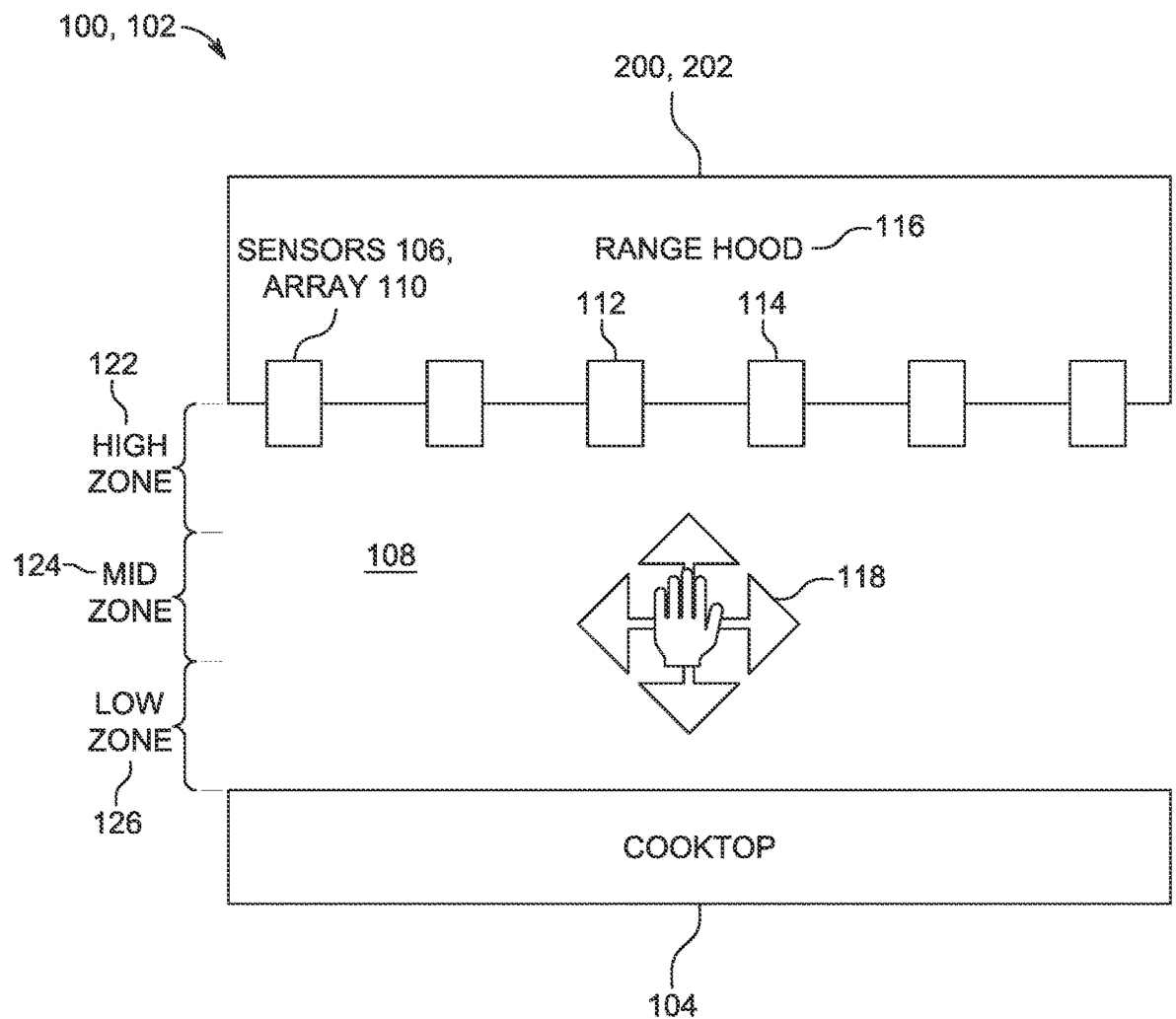
FIG. 1 is a diagram of an example architecture for a range hood ventilation system and control method.
Figure 2:
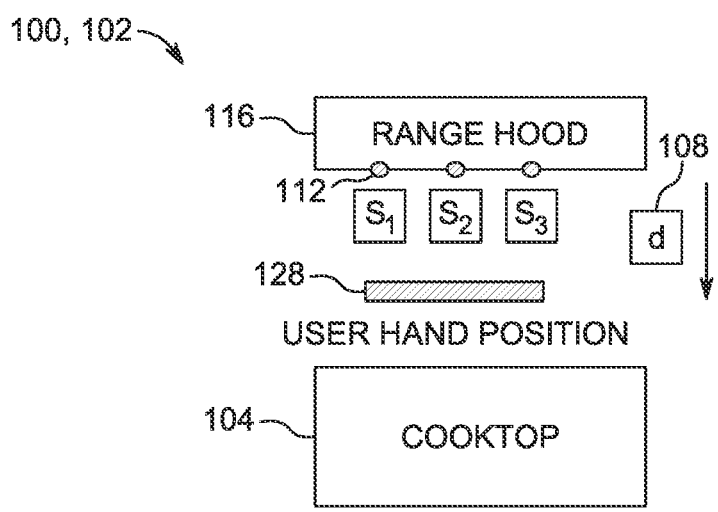
FIG. 2 is another diagram of an example architecture for the range hood ventilation system and control method of FIG. 1.

Generally, and with reference to FIGS. 1-8, a range (or cooktop) hood ventilation system 100 and gesture control method 102 for implementing control of the range hood ventilation system 100 are shown and described. The present disclosure contemplates arrangement of one or more sensors 106 about the range hood ventilation system 100, as shown in FIGS. 1 and 2. The sensors 106 detect a user of the range hood ventilation system 100. The gesture control method 102 of the range hood ventilation system 100 is implemented when the sensors 106 detect movements and/or gestures of the user that correspond to one or more control functions. The system and method 100, 102 for implementing control of the range hood ventilation system 100 comprises a number of functions (i.e., processes or algorithms, see FIGS. 6, 7, and 8). Gesture, touchless control, or contactless control, hereinafter referred to as gesture control, uses sensors to detect a user's presence and interprets user interactions to make changes to the range hood ventilation system 100. This change may include turning on and off a fan or light or adjusting the light intensity or fan speed or any other feature or function of the range hood ventilation system 100. The range hood ventilation system 100 and gesture control method 102 for implementing control of the range hood ventilation system 100 facilitate a control user interface without physical contact. For example, if a user has dirty hands—as might be typical for a cook that is preparing ingredients for a meal—or simply does not want to touch the range hood, the presently described gesture control method 102 and range hood ventilation system 100 represent an alternative. This disclosure contemplates replacement of physical user interfaces, such as those embodied by touchscreens, switches, dials, or the like, located on a range hood or wall mounted control unit. The range hood ventilation system 100 and gesture control method 102 may provide aesthetic appeal by facilitating a clean appearance of the controlled system (e.g., consumer facing surfaces may be free of knobs and switches).

FIG. 1 is a diagram of an example architecture for the range hood ventilation system 100. The range hood ventilation system 100 comprises the one or more sensors 106 mounted to a surface of a range hood 116. The one or more sensors 106 comprise time-of-flight (TOF) sensors 112 and/or infrared (IR) sensors 114. The sensors 106 may further include ultrasonic sensors, optical sensors, and/or other suitable sensors depending on the configuration of the range hood ventilation system 100. The TOF sensors 112 accurately detect a distance an object is from each sensor. The TOF sensors 112 also detect a duration (period of time) during which an object is in front of each sensor. Therefore, when the TOF sensors 112 are arranged in an array 110 along a range hood 116 of the range hood ventilation system 100, said TOF sensors 112 may be configured to detect user input 118, such as motions and/or gestures performed by a detected user.

Data received from the sensors 106 may be interpreted such that the user input 118 determines changes to be made to one or more states of the range hood ventilation system 100. When user input 118 is detected by the one or more sensors 106, it is a control gesture 120. The control gesture 120 may comprise user presence, dwell time, distance (such as to a user's hands and/or another suitable implement), motion, and/or other detectable features and/or actions of the user. The data received may identify the following qualities about the control gesture 120: a zone/level wherein the user input takes place, the horizontal direction of motion (left or right), the vertical direction of motion (up or down), the depth of motion (forward or backward), duration of motion, and/or velocity of motion. When combined, the array 110 of sensors 106 may distinguish tilt and rotation of the user's hand for sophisticated control gestures and precision control. Data gathered by the sensors 106 may be analyzed and compared against a database of the control gestures 120. The database of the control gestures 120 may include a preselected number of the control gestures defined, for example, by comparison of sensor array data (see FIG. 3 for example control gesture definitions).

In exemplary embodiments, the database may be a comprehensive listing of the control gestures 120 possible for a number of embodiments of the range hood ventilation system 100. Then, depending on the configuration of the sensors 106, the sensor array 110, and the range hood ventilation system 100 (e.g., how many fan speeds are available, how many light sources are available, etc.), a subset of the possible control gestures may be activated or preselected for use with a particular implementation of the range hood ventilation system 100. A database of the control gestures 120 may be updated to reflect new control gestures, new functionality of the range hood ventilation system 100, and/or user preferences. For example, a database of the control gestures 120 may include a large number of possible control gestures, but only a subset of control gestures specifically selected for an instance of the range hood ventilation system 100 may be recognized at any given time. Then, in this same example, a programming update may be received, such as during routine maintenance, that activates additional ones of the control gestures 120, thereby increasing the subset of control gestures that a user may perform to control the range hood ventilation system. In exemplary embodiments, a database of the control gestures may be stored in a memory module coupled to a microcontroller and forming a local component of the range hood ventilation system 100. The database in this example may be stored in the memory module when the range hood ventilation system 100 is programmed during manufacture or at the time of installation. In another embodiment, a database of the control gestures 120 may be stored on one or more remote computing resources coupled via a network to the range hood ventilation system 100. A microcontroller of the range hood ventilation system 100 may be communicatively connected to the one or more remote computing resources via a network such as the internet. In this example, comparison between sensor data received by the range hood ventilation system 100 may be performed by the one or more remote computing resources or by the microcontroller of the range control ventilation system 100. The one or more remote computing resources may be one or more servers, a network of distributed computing resources, a cloud computing resource, and/or another suitable resource. The present disclosure further contemplates a database of the control gestures 120 stored on a cloud computing resource and updated by a manufacturer of the range hood ventilation system 100. In an exemplary embodiment, the data gathered by the sensors 106 may be transmitted to the cloud computing resource, which in turn performs a comparison against a database of the control gestures 120 stored in the cloud. The comparison results are then communicated from the cloud computing resource back to the range hood ventilation system 100 to update the state of a fan motor or light source when one of the control gestures 120 has been positively recognized. Similarly, for internet-connected instances of the range hood ventilation system 100, the programming thereof may be updated remotely to add, change, or delete definitions of the control gestures 120 recognized by the system.

In still further examples, the range hood ventilation system 100 may include a learning mode. In the learning mode, a user may define a new one of the control gestures 120. For example, via one or more of the control gestures 120 or another interface type, the range hood ventilation system 100 may allow a user to perform a new control gesture while recording movements of the new control gesture using the one or more sensors 106. These recorded movements and the sensor data captured via the learning mode may then be used to define the new control gesture 120, in one or more of the memory locations noted hereinabove, and to associate the new control gesture with one or more particular functions of the range hood ventilation system 100 that are controlled thereby. The range hood ventilation system 100 may prompt a used to enter learning mode and/or create new control gestures and/or a user may customize the control gestures 120 in accordance with an end user preference. In another example, the control gestures 120 of the range hood ventilation system may enter a learning mode during setup so as to prompt a user to define one or more of the control gestures 120 before use begins. Alternatively, a mobile application, web-based application, and/or another user interface may allow a user to initiate the learning mode and assign newly user-defined gestures to certain functions of the range hood ventilation system 100 thereby establishing new control gestures.

The control gesture(s) 120 may include micromovements and macromovements. FIG. 1 illustrates a user's hand performing macromovements along two axis (although embodiments may detect movement along three axis) and through three zones within a gesture field 108. The three zones comprise a high zone 122, a middle zone 124, and a low zone 126. In the example shown in FIG. 1, the high zone 122 is nearest the range hood 116 and, therefore, nearest the sensors 106 mounted on the range hood 116. Likewise, the low zone 126 is nearest a cooking surface 104 over which the range hood 116 is installed. Dependent upon installation of the range hood 116 and the range hood ventilation system 100, it may or may not be desirable to assign meaning to depth of motion. For example, depth of motion may allow for an additional parameter and greater gesture control when the range hood 116 and cooking surface are installed against a wall such that a user is restricted to performing the control gesture(s) 120 from a single side (the front) of the cooking surface 104. However, in exemplary configurations having the cooking surface 104 and the range hood 116 installed in a workstation or kitchen island, the gesture control(s) 120 may be introduced from more than one side/direction relative the range hood 116. In this example, depth of motion may not be assigned meaning for control gestures so as to avoid ambiguous inputs.

FIG. 2 illustrates an example wherein the sensors 106 comprise TOF sensors 112. An exemplary user hand position 128 is shown relative the range hood 116, cooking surface, and the TOF sensors 112. A distance d is shown between the user hand position 128 and the TOF sensors 112. TOF sensors 112 are disposed on the range hood 116 and detect the distance d to a user hand and calculate a time-at-distance for a user hand moving through the exemplary user hand position 128. For example, the TOF sensors 112, when arranged in an array, may capture micromovements of a detected user within the gesture field 108. FIG. 3 illustrates example micromovements and some correspondence thereof with the one or more control gesture(s) 120 for operating the range hood ventilation system 100. The micromovements of FIG. 3 utilize the TOF sensors 112 in the configuration of FIG. 2, for example. The example control gestures 120 of FIG. 3 use at least first, second, and third TOF sensors $s_1$, $s_2$, $s_3$ of FIG. 2. For each of the TOF sensors $s_1$, $s_2$, $s_3$, a corresponding distance $d_1$, $d_2$, $d_3$ and times-at-distance $t_1$, $t_2$, $t_3$ are determined. Each of a number of control gestures 120a-120h conducts comparisons of the distances $d_1$, $d_2$, $d_3$ and times-at-distance $t_1$, $t_2$, $t_3$ detected by each of the TOF sensors $s_1$, $s_2$, $s_3$ to observe the execution of micromovements by a user. In the examples of FIG. 3, the user's hand performs micromovements that are then interpreted to implement control operations.

In the first control gesture 120a, the user's hand is temporarily placed within a sensed space under the TOF sensors $s_1$, $s_2$, $s_3$, within about six inches from a bottom of the range hood 116 (i.e., about six inches from the TOF sensor array $s_1$, $s_2$, $s_3$) for more than three seconds. The appropriate distance within a certain range is detected for each of the distances $d_1$, $d_2$, $d_3$ and the times-at-distance $t_1$, $t_2$, $t_3$ are each determined to be three seconds or more. In response to this gesture, the range hood ventilation system 100 activates a fan 202 within the range hood 116 to the most recent fan speed (e.g., for example, turning the fan to a "medium" setting because the fan 202 was most recently set to "medium" prior to having been disengaged). The remaining control gestures 120b-120h similarly determine and compare the distances $d_1$, $d_2$, $d_3$ and the times-at-distance $t_1$, $t_2$, $t_3$ detected by each of the TOF sensors $s_1$, $s_2$, $s_3$ to differentiate between micromovements. While eight exemplary control gestures are illustrated in FIG. 3, additional control gestures are contemplated having more or fewer detected features. Additionally, a plurality of the control gestures 120 may be performed in a sequence or in parallel (e.g., such as with right and left hands gesturing simultaneously) to provide more complex control and/or combine control operations (e.g., turn on fan and turn on light control gestures performed serially and/or a control gesture for "turn on light" combined with a level selection gesture to indicate a low light level).

Further, in FIG. 3, the second control gesture 120b steps fan speed down in response to a clockwise rotation of a user hand within the gesture field 108. The third control gesture 120c steps fan speed up in response to the counter-clockwise rotation of a user hand within the gesture field 108. The fourth control gesture 120d changes a fan motor state from "on" to "off" in response to swiping of a user hand from an interior position within the gesture field 108 to an exterior side position (e.g., swiping from middle to side in either direction) at a depth of six inches or less from the range hood 116. The fifth control gesture 120e returns a light source state of a light source 200 to a most recent state in response to holding of a user hand within a certain vertical range (the vertical range being different from that of the first control gesture 120a) for a preselected duration (e.g., longer than three seconds). The sixth control gesture 120f increases an intensity setting for the light source 200 in response to upward vertical movement of a user hand within the gesture field 108. The seventh control gesture 120g decreases an intensity setting for the light source 200 in response to downward vertical movement of a user hand within the gesture field 108. The eighth control gesture 120h changes a lighting source state from "on" to "off" in response to a swiping of a user hand similar to the movement of the fourth control gesture 120d, but the swiping of the eighth control gestures 120h is at a different depth as compared with the fourth control gesture 120d. For example, the eighth control gesture 120h may including the swiping movement between seven and thirteen inches below the range hood 116. The eighth control gesture 120h may be performed at a different depth than the fourth control gesture 120d or combined with another movement sequence to differentiate between control of the fan motor and the light source 200.

The range hood 116 may be installed at a variety of distances above the cooking surface 104 depending on consumer preference or kitchen configurations. Higher installation heights typically require greater exhaust air flow rates, supplied by the fan 202 disposed within the range hood 116. The exhaust air flow rate may be selected to appropriately capture and evacuate the byproducts of cooking dependent upon cooking surface, distance, etc. The TOF sensors 112 discussed with reference to FIGS. 1-3 may be positioned on the underside of the range hood 116. In alternative embodiments, one or more of the sensors 106 may be disposed outward facing from a range hood installation (e.g., horizontal or substantially horizontal, instead of substantially downward at the cooking surface 104) to detect user presence and/or to detect control gesture(s) 120 performed in front of the range hood 116 instead of, or in addition to, under the range hood 116. During an initialization or calibration sequence, the TOF sensors 112 may determine the installed distance from the cooktop to the bottom of range hood. This distance may then be used to adjust certain parameters of range hood operation. For example, if the hood is relatively close to the cooking surface 104, each fan speed level may be indexed against a lower benchmark setting so as to use the lowest fan speed necessary for functionality and increase operational efficiency by leveraging the lower installation height of the range hood (which better captures the cooking plume resulting in lower air flow exhaust rates providing adequate ventilation). Not only is customized benchmarking of fan speed more efficient but decreased fan speeds also result in decreased fan noise. Decreased fan noise is considered desirable by many consumers.

The range hood-to-cooking surface distance determination may also be used for benchmarking of other compensation algorithms related to sensing cooking surface temperatures, sensing of volatile organic compounds (VOCs) released during cooking, sensing humidity, or adjustment of lighting levels or light focus on the cooking surface 104 to further reduce power consumption. Still further, a three-dimensional space (i.e., the gesture field 108) within which the control gestures are performed may be calibrated in accordance with a determination of available space. For example, the high zone 122, the middle zone 124, and the low zone 126 of FIG. 1 may be calibrated such that the zones 122, 124, 126 are of equal height and/or volume. Further, the example user hand position of FIG. 2 may be calibrated in accordance with cooking surface height. Such calibration allows for the first control gesture 120a to respond to a hand that is safely above the cooking surface 104.

In further exemplary embodiments, TOF sensors 112 are combined with IR sensors 114. Data from the IR sensors 114 could improve algorithm performance during automatic operation and/or smart sensing by combining presence detection (e.g., via the TOF sensors 112) with temperature detection (e.g., via the IR sensors 114). The TOF sensors 112 and the IR sensors 114 may be used together or separately to further perform ongoing calibration and detection of obstructions and/or ventilation targets. For example, the position of cookware (e.g., pots, pans, utensils) on a cooktop surface may be detected, and, depending on the location, adjustable vent openings or baffles may be used to concentrate air flow closer to the source of pollution. This customization of ventilation may require less air flow, lower fan speed, lower noise, and decreased power consumption. Additionally, certain of the control gestures 120 may be adjusted in accordance with the presence of obstacles, such as cookware within the gesture field. Again, referring to the first control gesture 120a as an example, when large pieces of cookware cover a portion of the cooktop, it may be desirable to adjust the acceptable distance from the range hood whereat the user may hold their hand to effectuate the control gesture 120a.

Additionally, the TOF sensors 112 may be used to detect whether a user occupies the gesture field. For example, a user may wish to stir a pot on the cooktop. The TOF sensors 112 may be able to monitor this user motion while continuing to call one or more functions to detect another user presence inserted into the gesture field for the purpose of delivering one or more of the control gesture(s) 120. Further, the TOF sensors 112 may be able to determine that a human interaction has ended (e.g., user presence not detected for a certain duration, intentionally or unintentionally) and execute certain functions in response (e.g., if an unattended cooking scenario is detected, then an alarm may be activated, and a ventilation rate may be adjusted to account for additional pollution and/or smoke).

Figure 4:
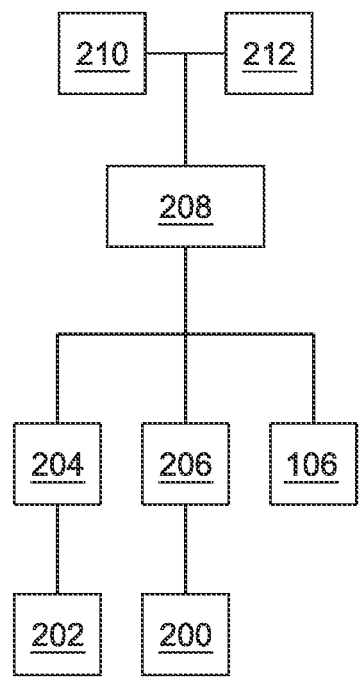
FIG. 4 is a block diagram comprising components of a gesture control module for incorporation into the range hood ventilation system of FIGS. 1 and 2.
Figure 5:
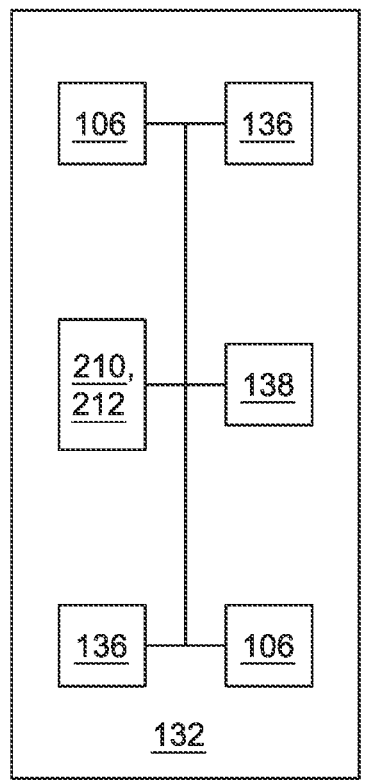
FIG. 5 is a block diagram showing a gesture control module for incorporation into a wall control module of the range hood ventilation system of FIGS. 1 and 2.
Figure 6A:
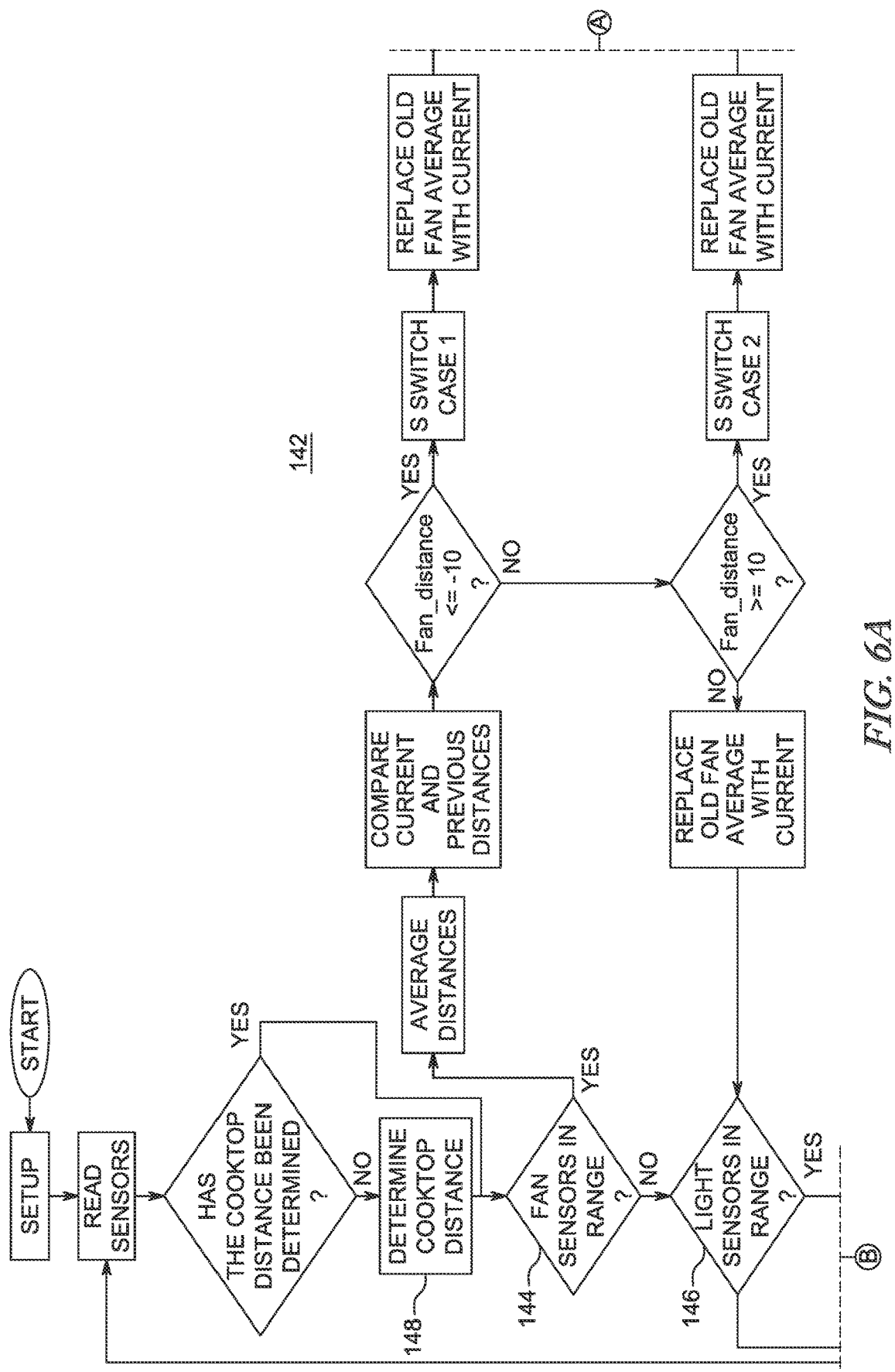
FIG. 6A is a portion of a flowchart detailing operation of an exemplary control process for actuation of the range hood ventilation system via hand tilt detection.
Figure 6B:
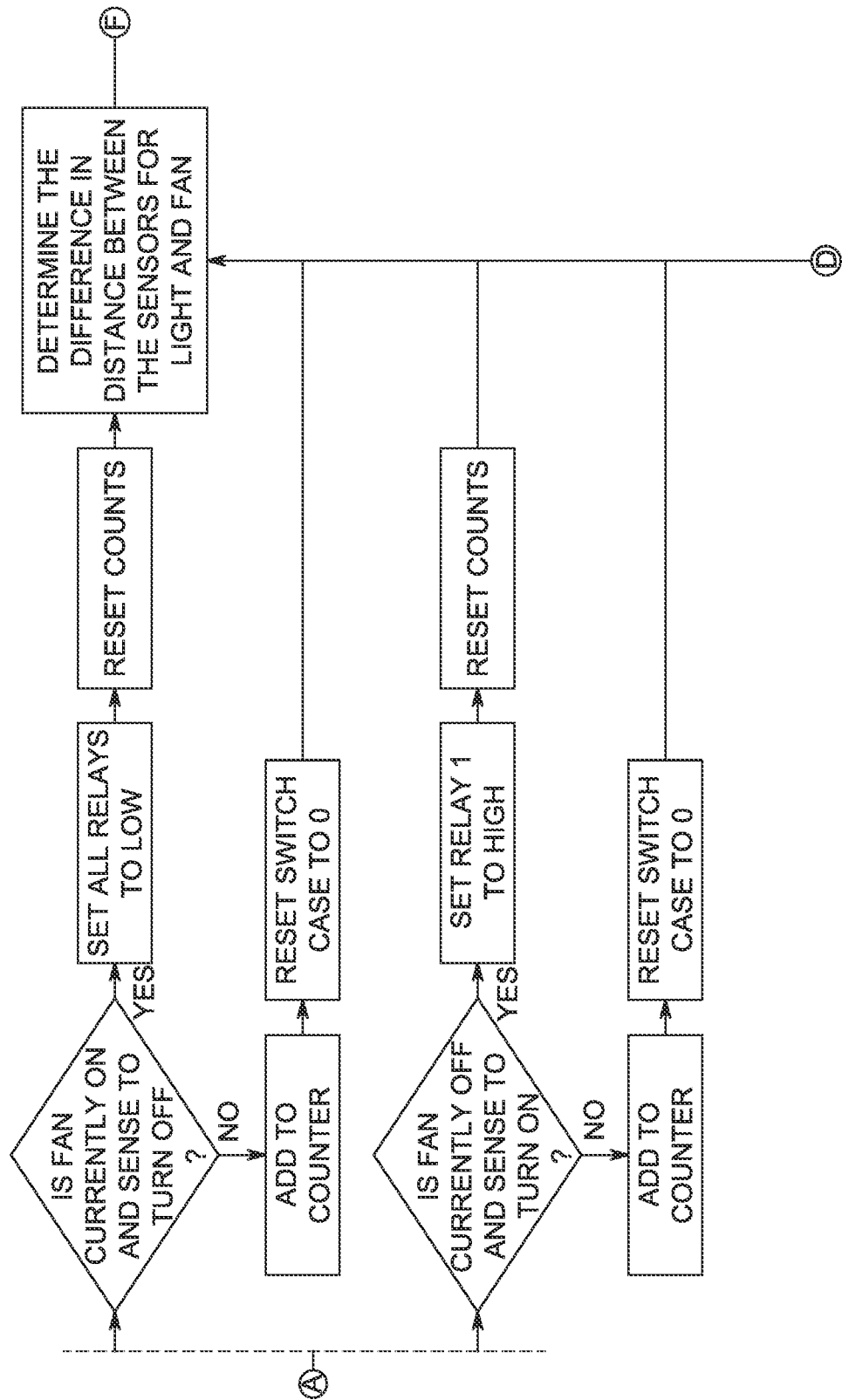
FIG. 6B is another portion of the flowchart detailing operation of the exemplary control process for actuation of the range hood ventilation system via hand tilt detection.
Figure 6C:
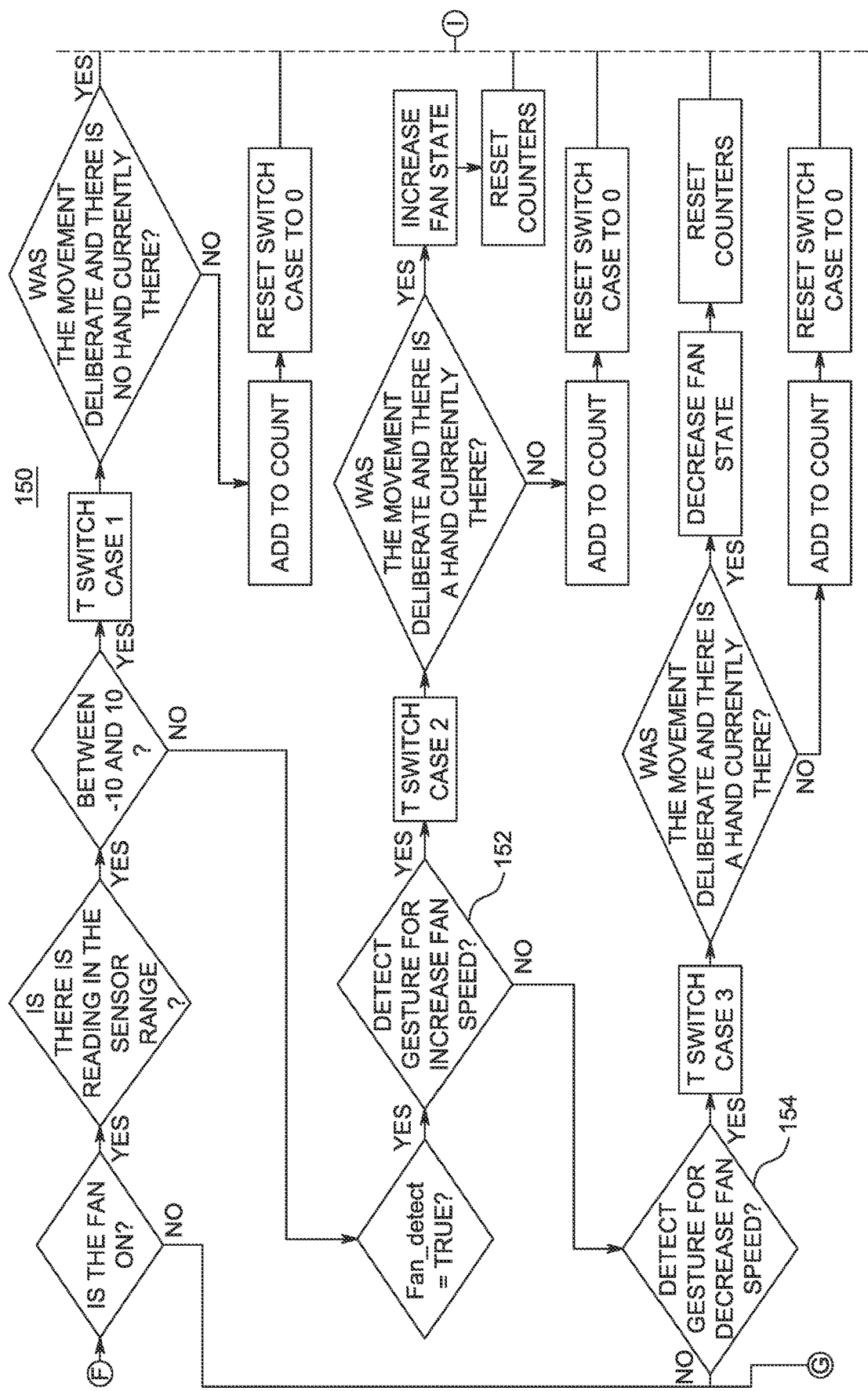
FIG. 6C is another portion of the flowchart detailing operation of the exemplary control process for actuation of the range hood ventilation system via hand tilt detection.
Figure 6D:
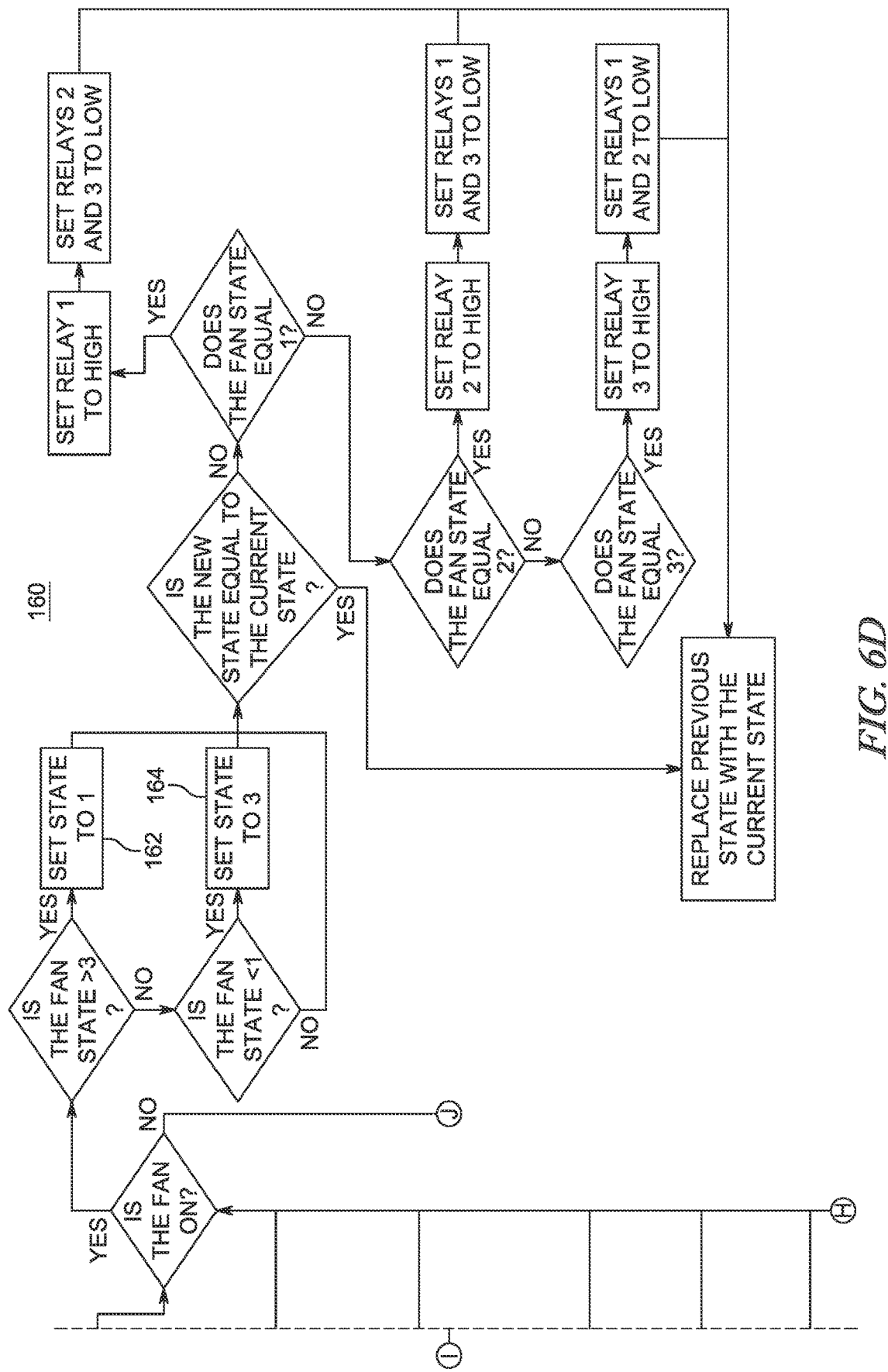
FIG. 6D is another portion of the flowchart detailing operation of the exemplary control process for actuation of the range hood ventilation system via hand tilt detection.
Figure 6E:
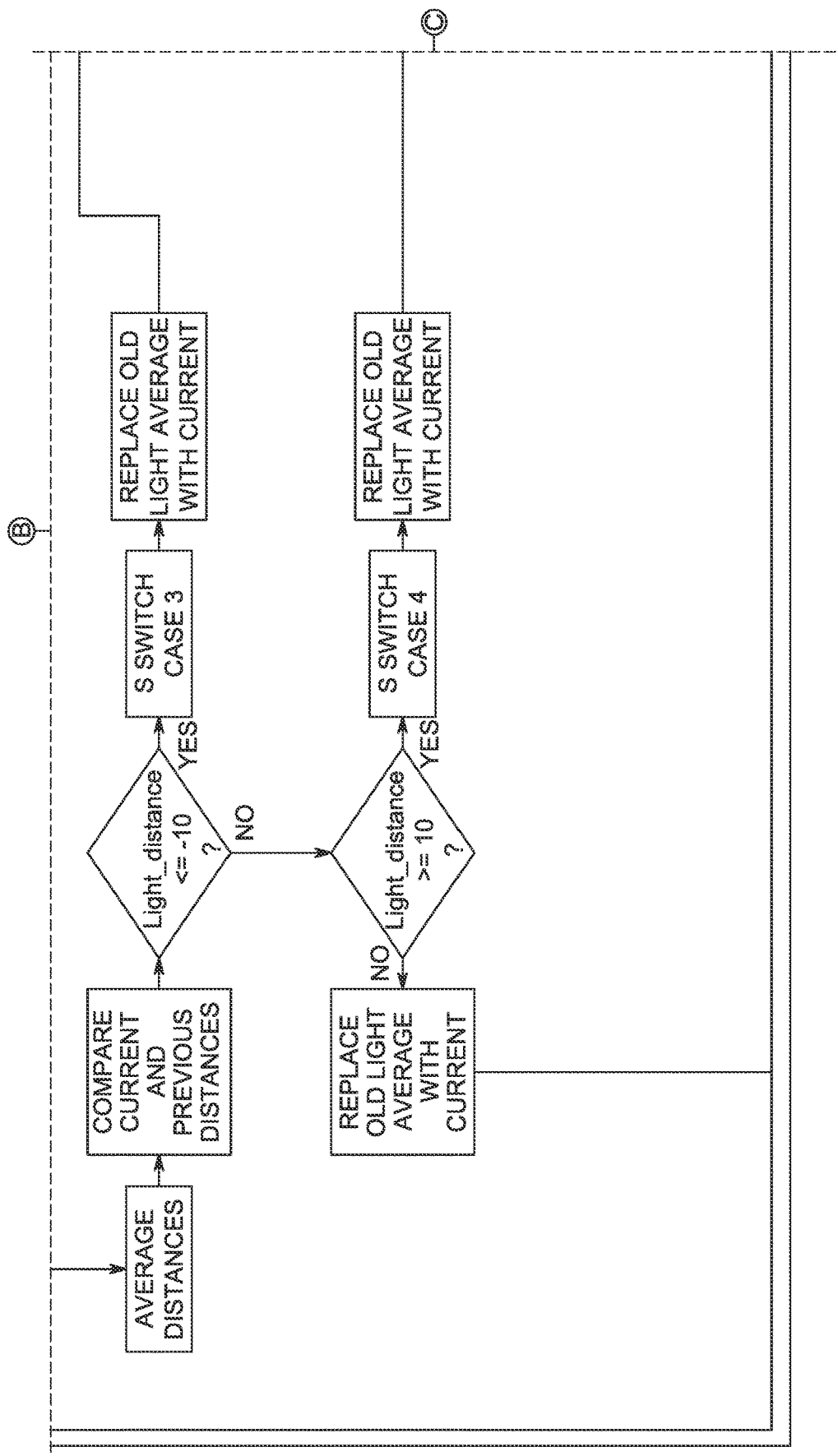
FIG. 6E is another portion of the flowchart detailing operation of the exemplary control process for actuation of the range hood ventilation system via hand tilt detection.
Figure 6F:
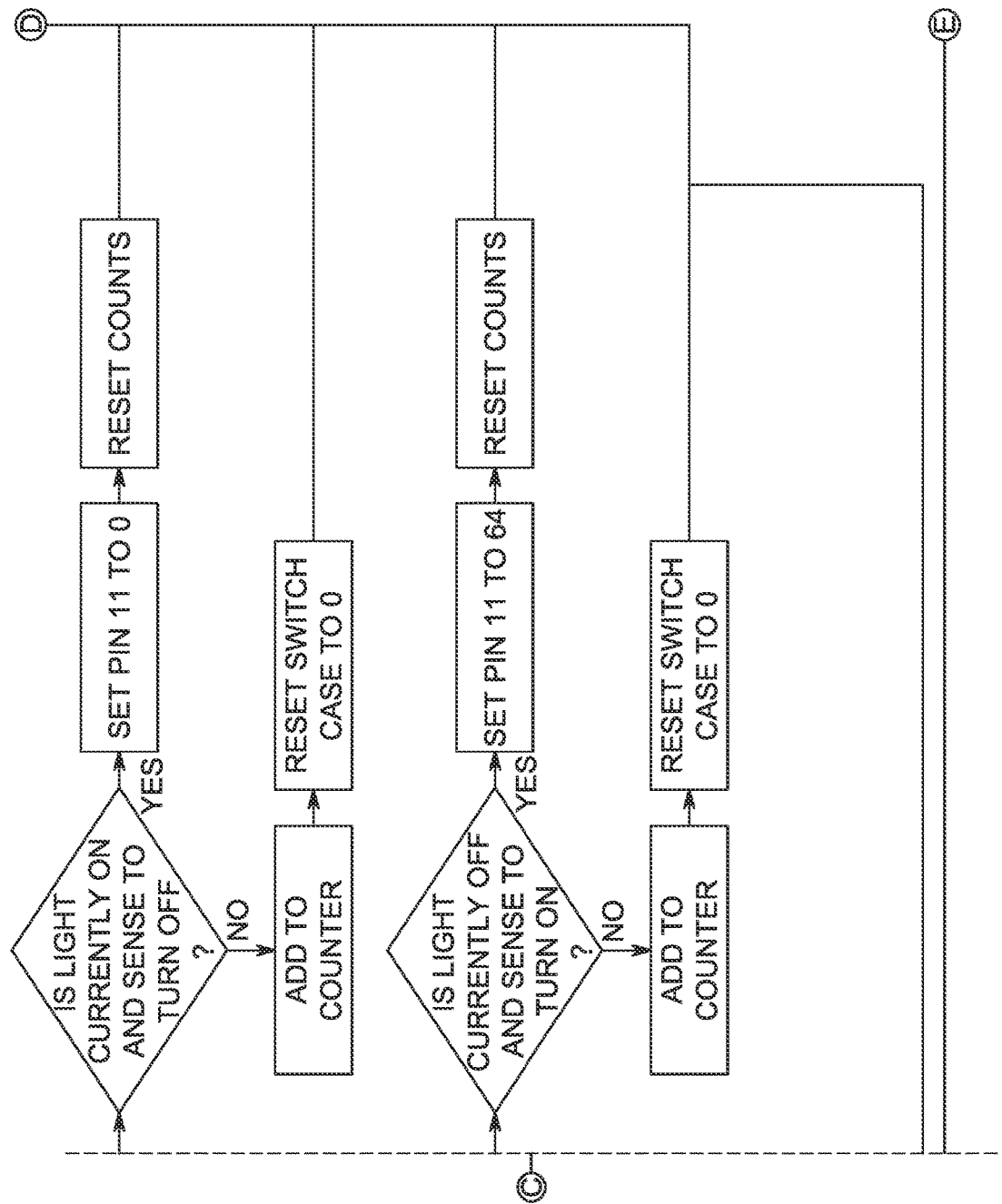
FIG. 6F is another portion of the flowchart detailing operation of the exemplary control process for actuation of the range hood ventilation system via hand tilt detection.
Figure 6G:
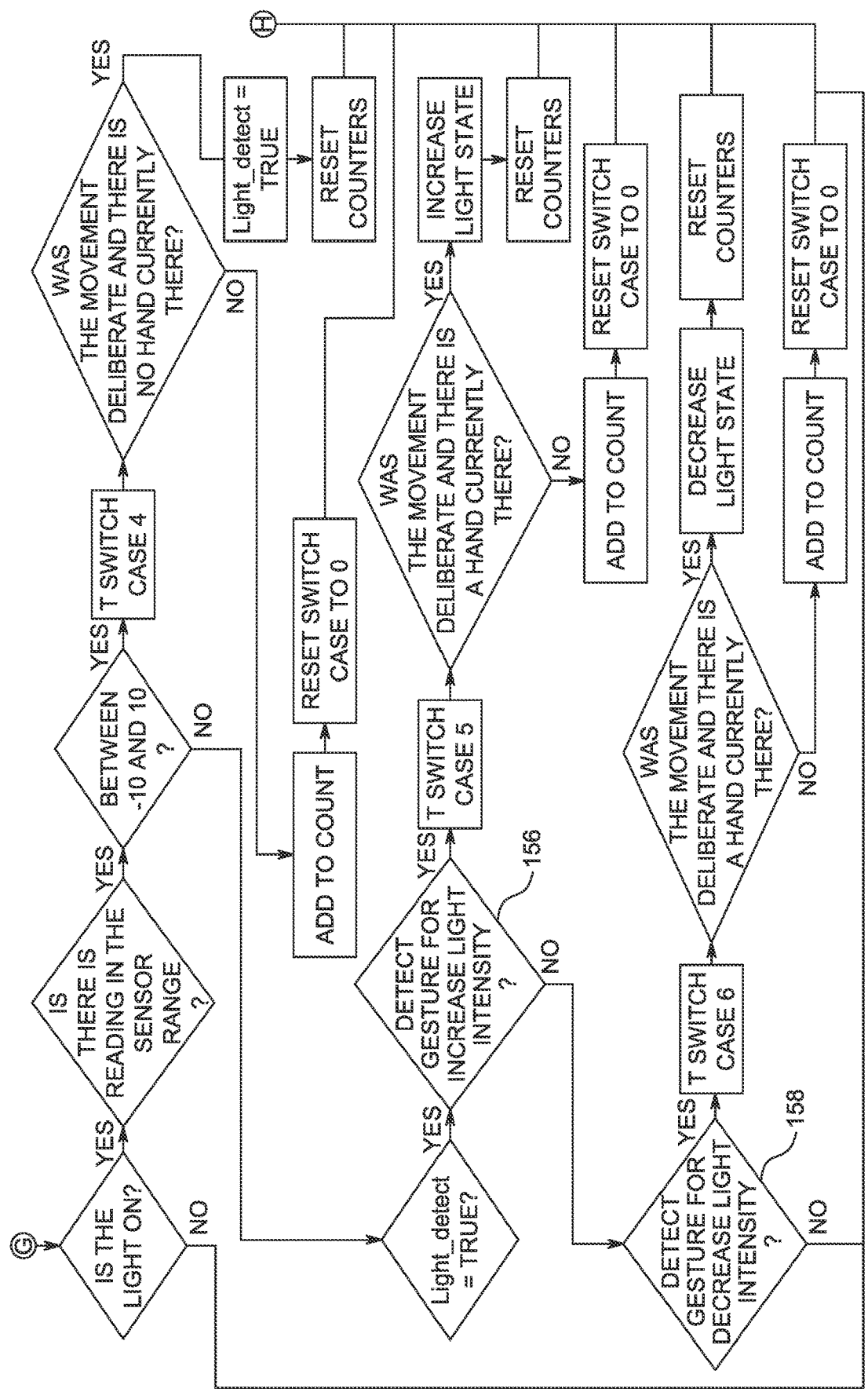
FIG. 6G is another portion of the flowchart detailing operation of the exemplary control process for actuation of the range hood ventilation system via hand tilt detection.
Figure 6H:
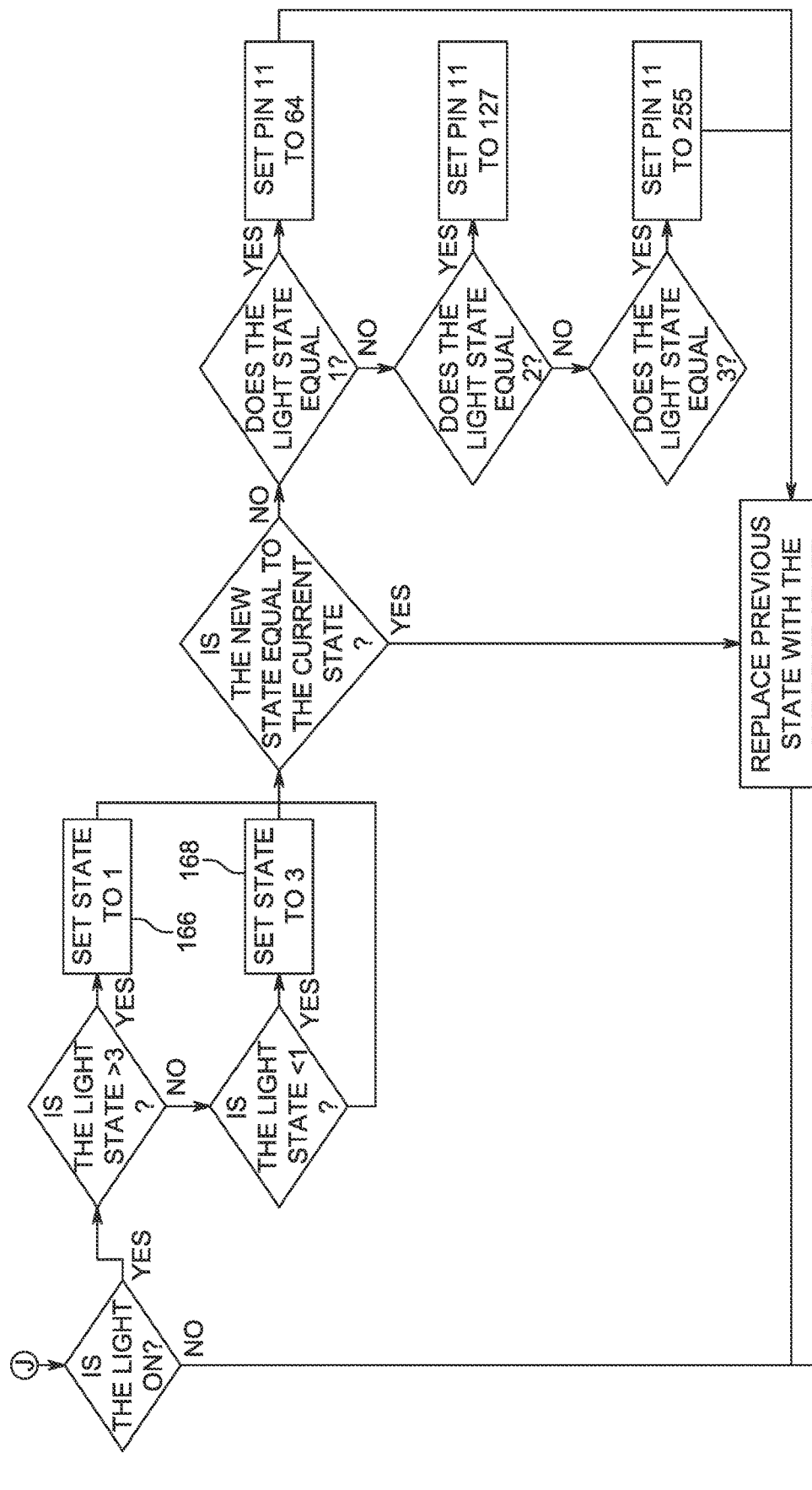
FIG. 6H is another portion of the flowchart detailing operation of the exemplary control process for actuation of the range hood ventilation system via hand tilt detection.

An example embodiment of the range hood ventilation system 100 is shown in FIGS. 4 and 5. FIG. 4 illustrates a block diagram for a circuit that performs the functions of the range hood ventilation system 100 and controls the light source 200 and the fan 202. A plurality of relays may form a motor control unit 204, while an LED driver circuit 206 controls the light source 200. A microcontroller 210 and memory module 212 may be housed separately, such as on another PCB (printed circuit board) and be communicatively coupled with the control units shown in FIGS. 4 and 5. The microcontroller 210 may include inputs for first, second, and third sensors $s_1$, $s_2$, $s_3$. Command/control signals may be directed by the microcontroller 210 and delivered to the lighting source 200 and the fan 202 via, respectively, the LED driver circuit 206 and the motor control unit 204 shown in this example. Alternatively, certain control signals may be developed on remote computing resources other than a microcontroller. For example, the block diagram shown in FIG. 4 may be communicatively coupled, such as by one or more communications modules/interfaces 208, implementing wireless/wired electronic communications protocols, with a network and one or more remote computing resources, cloud servers, distributed computing resources, mobile devices, HVAC system controllers, smart home controllers, and/or other suitable controllers for performing the steps of recognizing the control gestures 120 and developing command/control signals therefrom.

The one or more sensors 106 shown in FIG. 5 may be incorporated into a wall control unit housing to implement operational control of the range hood ventilation system 100 via a gesture control wall unit system 132. For example, a number of the sensors 106 may be disposed in the wall unit housing instead of, or in addition to, one or more conventional switches. The sensors 106 may include TOF sensors, IR sensors, ultrasonic sensors, optical sensors, and/or other suitable sensors for detecting the control gesture(s) 120. The control gesture(s) 120 used with the gesture control wall unit system 132 may be different in detail and location from the control gesture(s) 120 discussed hereinabove, although many similarities may exist. For example, on/off operation of the fan 202, light 200, and/or other features associated with the range hood ventilation system 100 operationally connected to the gesture control wall unit system 132 may be implement in a touchless manner by hovering a user's hand over the wall control unit housing (and the sensors 106 housed therein) for more than three seconds (similar to the first control gesture 120a described with reference to FIG. 3). The sensors 106 of the wall control unit system 132 may replace conventional, physical switches or be implemented alongside physical switches. In exemplary embodiments, one or more physical switches may override the gesture control(s) 120 of the gesture control wall unit system 132. Additionally, the gesture control feature may be selectively enabled or disabled via a physical switch (i.e., the physical switch must be actuated to the "on" position for the sensors 106 to begin detecting the control gesture(s) 120). Gesture control wall unit system 132 may include the one or more sensors 106, a manual override 136 associated with each sensor, the microcontroller 210 (the microcontroller 210 may be housed on a separate board in exemplary embodiments and may include one or more of the memory modules 212), and one or more electronic interfaces 138, including an in-system programming (ISP) interface and or a universal serial bus (USB) connection, for communicating control signals from the gesture control wall unit system 132 to the range hood ventilation system 100 and for reprogramming of the gesture control wall unit system 132.

Referring to FIGS. 6A-6H, a control algorithm 140 is illustrated as a flowchart. A calibration process 142 is shown for calibrating and coordinating the sensors 106 associated with control of the fan 200 and light sources 202 of the range hood ventilation system 100. The calibration process 142 includes steps 144, 146 for polling fan and light sensors to determine that sensors do not accumulate error, particularly for distance detection. As indicated in the control algorithm 140, the sensors 106 may be arranged as fan sensors and light sensors such that the control gesture(s) directed to the fan 200 and the light source 202 are detected by dedicated sets of the sensors 106 or dedicated sensor arrays. Alternative embodiments may use all available sensors for detection of control gesture(s) 120 for all functions of the range hood ventilation system 100. The calibration process 142 also includes a step 148 for determining distance between the cooking surface 104 and the one or more sensors 106.

A gesture detection process 150 is shown after the calibration process 140. In the gesture detection process 150, the sensors 106 determine whether the control gestures 120 were intentional and what operation of the range hood ventilation system 100 is being directed. Gesture detection steps include steps for detecting a control gesture to increase or decrease fan speed 152, 154, and steps for detecting a control gesture to increase or decrease light intensity 156, 158. After the control gesture(s) 120 are detected in the gesture detection process 150, the control algorithm 140 proceeds to a state update 160 process. The state update process 160 accounts for the control gesture(s) 120 received during the gesture detection process 150 and updates state registers for the fan 200 and light source 202, respectively, at state register update steps 162, 164, 166, 168.

Figure 7:
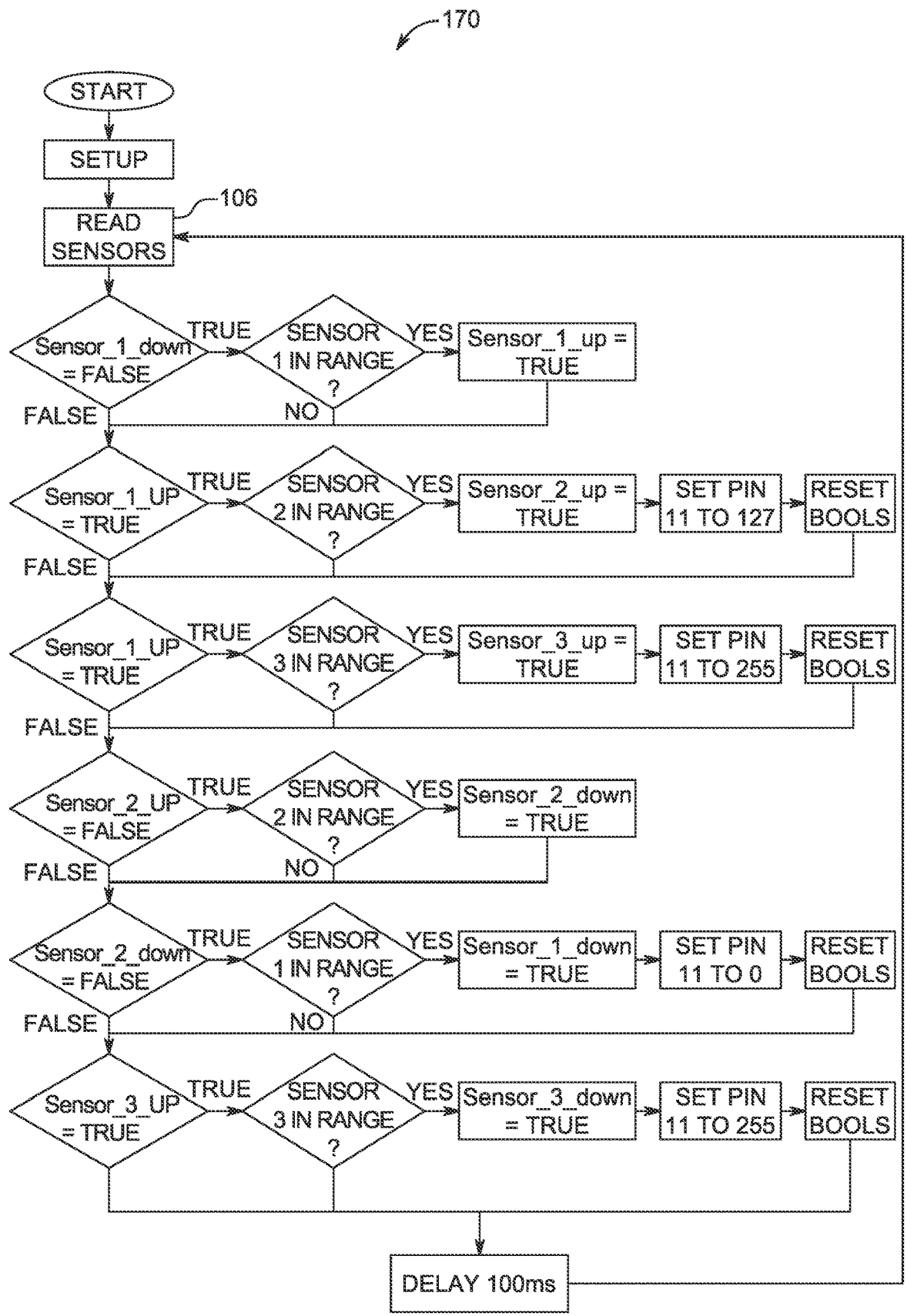
FIG. 7 is a flowchart detailing operation of an exemplary sensor polling process for operation of the range hood ventilation system.
Figure 8A:
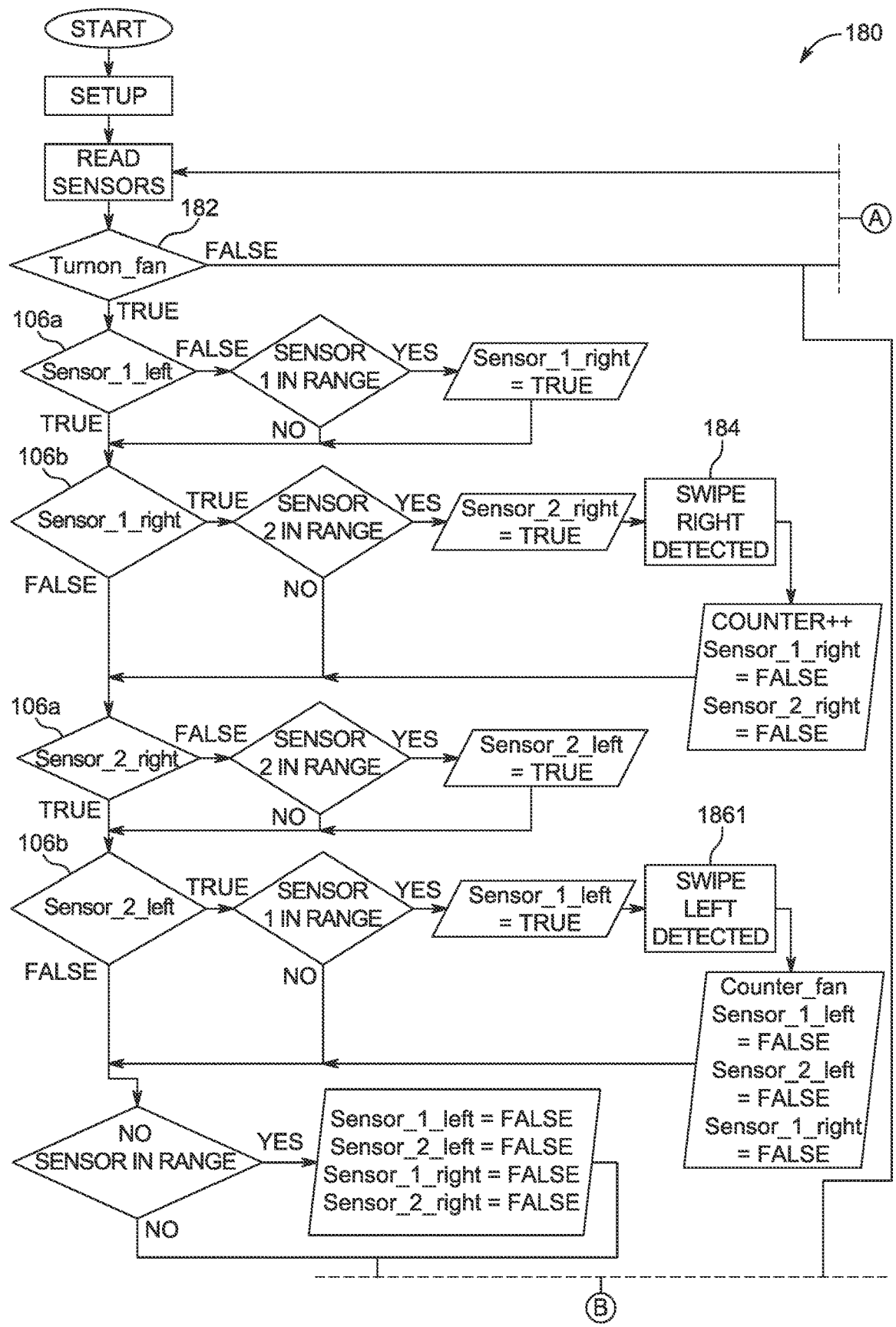
FIG. 8A is a portion of a flowchart detailing operation of an exemplary control process for actuation of the range hood ventilation system with fan and/or light levels (e.g., "off", "low", "medium", "high", or the like)
Figure 8B:
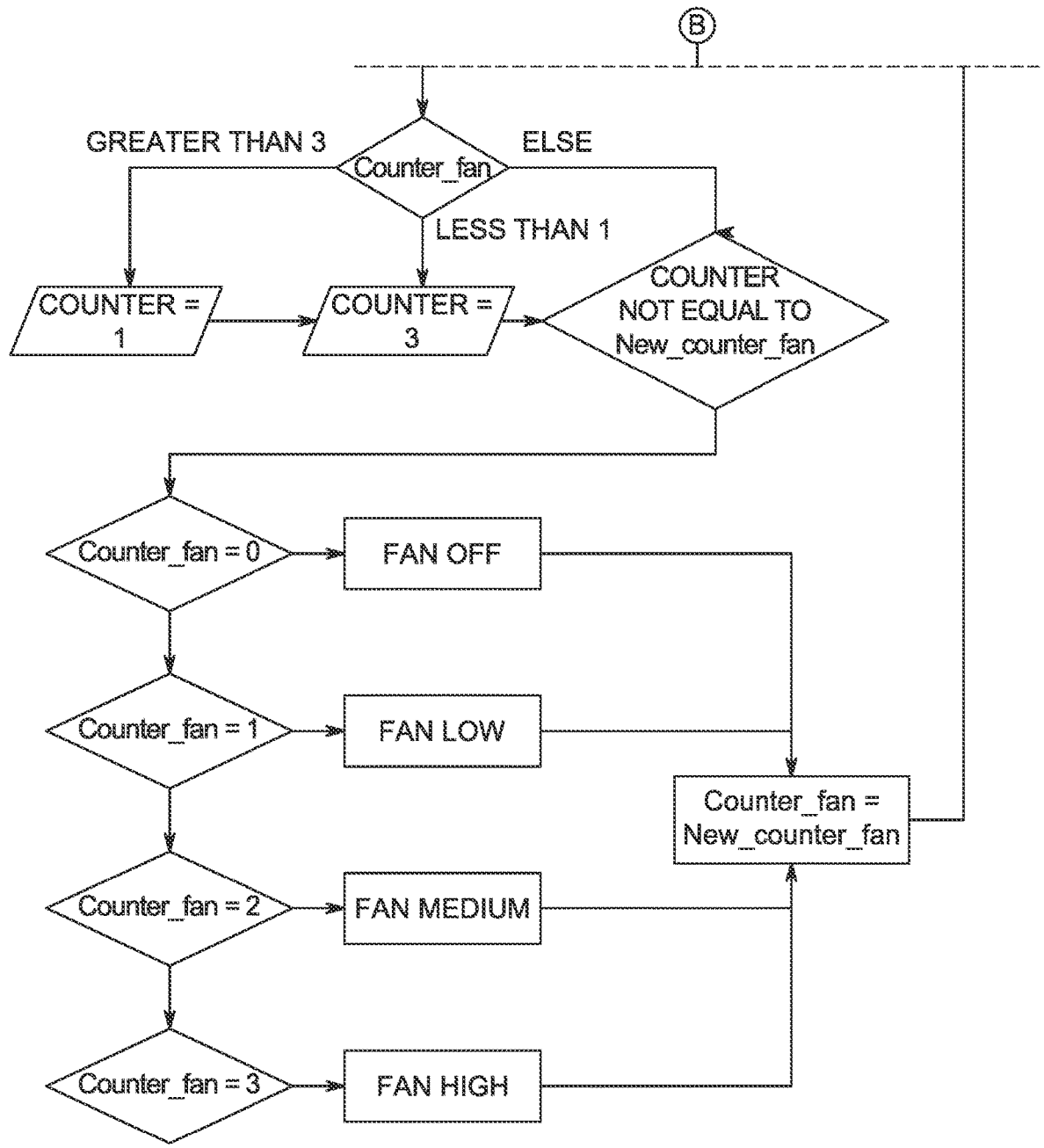
FIG. 8B is another portion of a flowchart detailing operation of the exemplary control process for actuation of the range hood ventilation system with fan and/or light levels.
Figure 8C:
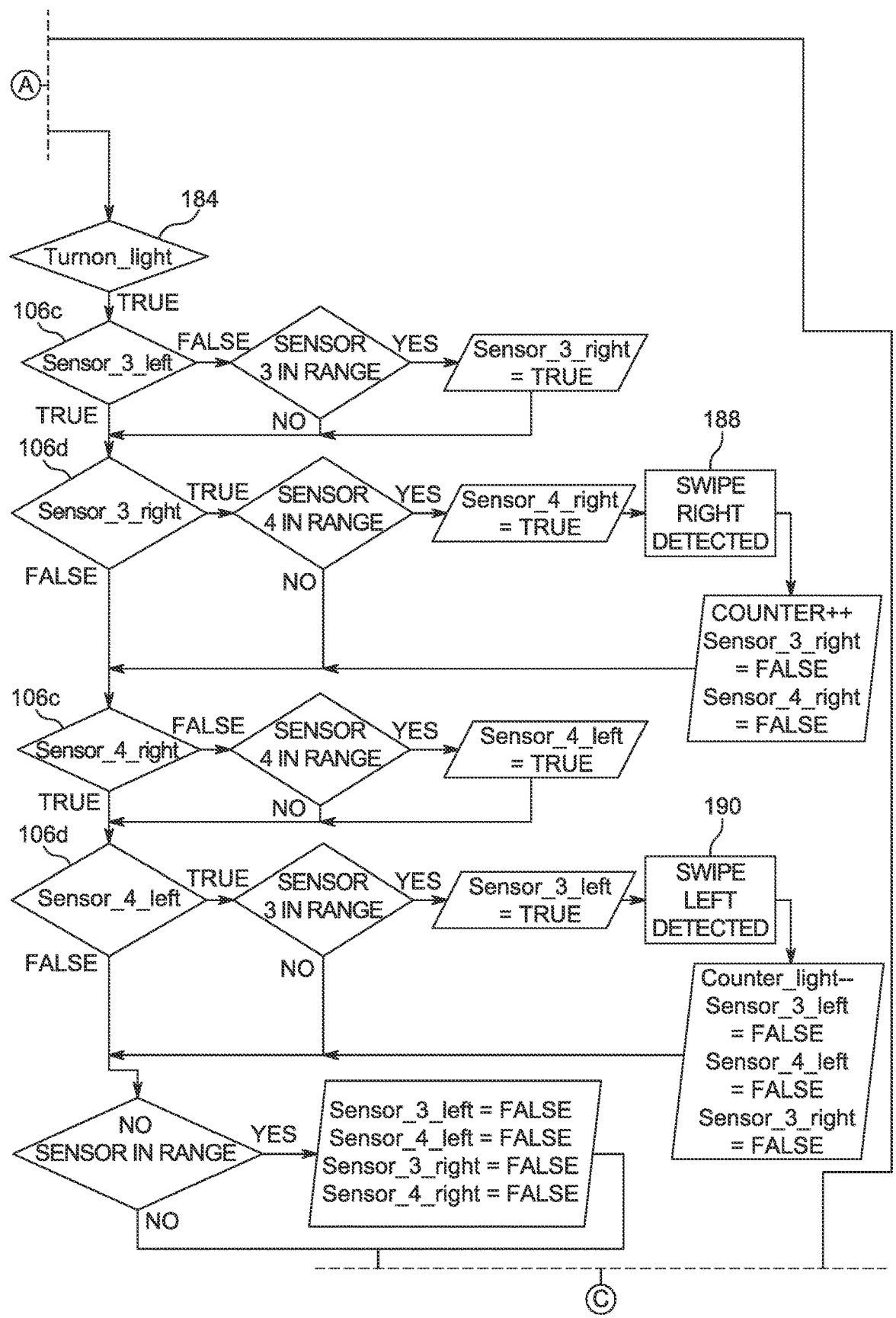
FIG. 8C is another portion of a flowchart detailing operation of the exemplary control process for actuation of the range hood ventilation system with fan and/or light levels.
Figure 8D:
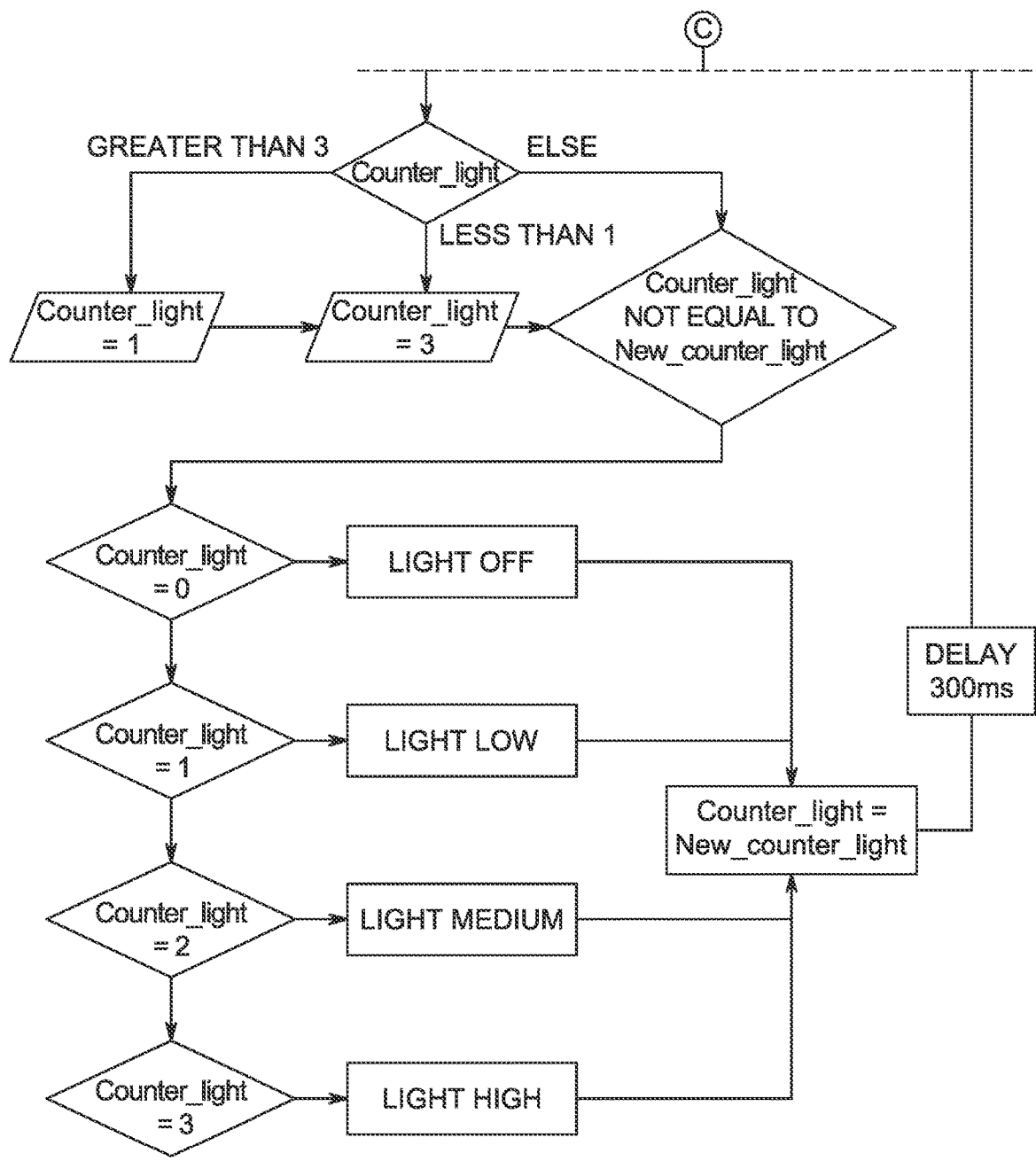
FIG. 8D is another portion of a flowchart detailing operation of the exemplary control process for actuation of the range hood ventilation system with fan and/or light levels.

In FIG. 7, a sensor polling function/process 170 is illustrated as a flowchart. In the sensor polling function 170, three sensors are polled. In exemplary embodiments, the three polled sensors may correspond to the TOF sensors $s_1$, $s_2$, $s_3$ of FIG. 2. FIGS. 8A-8D illustrate a hand swipe gesture detection process 180 as a flowchart. In the hand swipe gesture detection process 180, left and right sensors 106a, 106b are polled for gesture control of the fan 202 during a fan control function 182, and left and right sensors 106c, 106d are polled for gesture control of a light during a light control function 184. In each function, detection data from the left and right sensors 106a, 106c, 106b, 106d are compared to determine whether or not a user has swiped a hand from the left to the right or in the opposite direction at comparison steps 184, 186, 188, 190. Rightward swipes detected at the steps 184, 188 effectuate increases in the fan and light speed, respectively. Likewise, leftward swipes detected at steps 186, 190 effectuate decreases in the fan and light speed, respectively.

The embodiment(s) described above may be combined in full or in part, with any alternative embodiment(s) described.

Exemplary System Architecture

Architecturally, the representative technology may be deployed at residential locations or for commercial kitchen floorplans. Embodiments of the disclosed system and method 100, 102 are described with reference to FIGS. 1-8. In certain aspects, the system and/or method 100 may be implemented using hardware or a combination of software and hardware, either by dedicated devices and control networks or integrated into other control systems such as centralized HVAC control systems and/or other smart home control systems. Computing device(s), microcontrollers, and networks implementing the system and/or method 100, 102 may be, for example, servers, distributed computing resources, servers, microcontrollers, or any other devices having appropriate processor, memory, and communications capabilities for implementing the control method 102 and continuously polling the sensors 106 as described hereinabove.

According to one aspect of the present disclosure, the disclosed system can be implemented using a computer system in response to a processor executing one or more sequences of one or more instructions contained in memory. Such instructions may be read into memory from another machine-readable medium, such as data storage device. Execution of the sequences of instructions contained in main memory causes the processor to perform the process steps described herein. In alternative implementations, hard-wired circuitry may be used in place of or in combination with software instructions to implement various embodiments of the present disclosure. Thus, implementations of the present disclosure are not limited to any specific combination of hardware circuitry and software. The range hood ventilation system 100 and gesture control method 102 may be controlled by and execute operations partly or wholly stored and executed remotely (e.g., on a server, in the cloud) or another suitable system such as a main controller/processor operating a smart home system or more comprehensive ventilation system of which the range hood ventilation system 100 is a component.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Numerous modifications to the present disclosure will be apparent to those skilled in the art in view of the foregoing description. Preferred embodiments of this disclosure are described herein, including the best mode presently known carrying out the disclosure. It should be understood that the illustrated embodiments are exemplary only and should not be taken as limiting the scope of the disclosure.

What is claimed is:

1. A ventilation system, comprising:
   at least one user directed component;
   a range hood configured to be mounted above a cooking surface;

a plurality of sensors disposed on the range hood facing toward the cooking surface and configured to detect a plurality of control gestures within a gesture field designated for presentation of control gestures by a user, wherein a control gesture of the plurality of control gestures is presented within the gesture field for detection of said control gesture by the plurality of sensors, and wherein the plurality of sensors recognizes the control gesture as corresponding to an operation of the at least one user directed component; and a controller for polling the plurality of sensors and converting a recognized control gesture to a command signal for operating the at least one user directed component.

2. The ventilation system of claim 1, wherein the plurality of sensors comprises a number of time-of-flight sensors.

3. The ventilation system of claim 2, wherein the plurality of sensors is configured in an array and directed at the gesture field.

4. The ventilation system of claim 3, wherein data from the plurality of sensors in the array is compared to recognize hand motions corresponding to a particular control gesture of the plurality of control gestures.

5. The ventilation system of claim 2, wherein the range hood comprises at least a fan and a light source.

6. The ventilation system of claim 5, wherein the gesture field is configured between the range hood and the cooking surface.

7. The ventilation system of claim 1, wherein the plurality of sensors determines a distance and a time-at-distance for subjects that enter the gesture field.

8. The ventilation system of claim 7, wherein the distance and the time-at-distance detected by each of the number of time-of-flight sensors are compared to recognize a particular control gesture of the plurality of control gestures.

9. The ventilation system of claim 8, wherein the control gestures adjust an operational state of at least one of a fan and a light source of the range hood.

10. A method of operating a range hood ventilation system having a fan and a light source, the method comprising:
configuring a plurality of sensors to detect movement proximal the range hood ventilation system;
comparing the movement detected by each of the sensors to determine relative location information about the movement;
determining whether the movement is intended as one of a plurality of control gestures;
wherein directional movements in the one or more of the plurality of control gestures indicate a relative change in operational state of the at least one of the fan and the light source; and
operating the range hood ventilation system in response to a determination that the movement is a particular one of the plurality of control gestures.

11. The method of operating the range hood ventilation system of claim 10, wherein the plurality of sensors is arranged in one or more arrays along one or more surfaces of the range hood.

12. The method of operating the range hood ventilation system of claim 11, further comprising storing in memory a plurality of control processes that correspond to the plurality of control gestures.

13. The method of operating the range hood ventilation system of claim 12, wherein the control processes are invoked by detection of one or more of the plurality of control gestures.

14. The method of operating the range hood ventilation system of claim 13, further comprising executing at least one control process invoked by detection of the one or more control gestures to alter an operational state of at least one of a fan and a light source.

15. The method of operating the range hood ventilation system of claim 10, wherein the directional movements in the one or more control gestures indicate an increase or a decrease in fan speed, dependent on the direction.

16. The method of operating the range hood ventilation system of claim 10, wherein the directional movements in the one or more control gestures indicate an increase or a decrease in light intensity of the light source, dependent on the direction.

17. A control system for a range hood ventilation system, the control system comprising:
a plurality of sensors;
a memory;
a processor;
a plurality of operational states;
a plurality of control gestures,
wherein the plurality of sensors are configured to detect at least one of the plurality of control gestures in a gesture field, and the processor is configured to determine a control signal in response to data from the plurality of sensors when the at least one of the plurality of control gestures is detected,
wherein the control signal controls an operational state of the range hood ventilation system;
wherein the gesture field defines a plurality of zones and each of the plurality of zones is a different distance from the sensors and the processor is configured assigns different control signals to one or more of the plurality of control gestures depending on which of the plurality of zones in which the control gesture is detected.

18. The control system of claim 17, wherein the plurality of sensors comprises at least one of time-of-flight sensors, infrared sensors, optical sensors, and ultrasonic sensors.

19. The control system of claim 18, wherein each of the plurality of control gestures are defined by a movement sequence of the hand of a user as detected by more than one of the plurality of sensors over a period of time.

* * * * *